(12) United States Patent
Petrucci et al.

(10) Patent No.: US 9,780,879 B2
(45) Date of Patent: Oct. 3, 2017

(54) VEHICLE COMMUNICATION SYSTEM HAVING SELF-CONFIGURING OPTICAL INTERFACES

(71) Applicant: GM GLOBAL TECHNOLOGY OPERATIONS LLC, Detroit, MI (US)

(72) Inventors: David R. Petrucci, Warren, MI (US); David Heiden, Clarkston, MI (US); Charles A. Massoll, Milford, MI (US); Duane S. Carper, Davison, MI (US)

(73) Assignee: GM GLOBAL TECHNOLOGY OPERATIONS LLC, Detriot, MI (US)

( * ) Notice: Subject to any disclaimer, the term of this patent is extended or adjusted under 35 U.S.C. 154(b) by 0 days.

(21) Appl. No.: 14/964,043

(22) Filed: Dec. 9, 2015

(65) Prior Publication Data

US 2017/0170900 A1    Jun. 15, 2017

(51) Int. Cl.
| | |
|---|---|
| *G02F 1/00* | (2006.01) |
| *H04B 10/25* | (2013.01) |
| *H04B 10/03* | (2013.01) |
| *H04B 10/077* | (2013.01) |
| *H04B 10/079* | (2013.01) |
| *H04L 7/00* | (2006.01) |

(52) U.S. Cl.
CPC ............ *H04B 10/25* (2013.01); *H04B 10/03* (2013.01); *H04B 10/0775* (2013.01); *H04B 10/0791* (2013.01); *H04L 7/0075* (2013.01)

(58) Field of Classification Search
CPC .... H04B 10/25; H04B 10/03; H04B 10/0775; H04B 10/0791; H04L 7/0075
USPC .............................................. 398/1
See application file for complete search history.

(56) References Cited

U.S. PATENT DOCUMENTS

| | | | |
|---|---|---|---|
| 8,929,198 B2* | 1/2015 | Yousefi ................. | H04N 7/183 370/216 |
| 2009/0196609 A1* | 8/2009 | Koyama ............. | H04J 14/0246 398/58 |
| 2013/0071125 A1* | 3/2013 | Susanto ................. | G02B 6/423 398/135 |
| 2015/0016824 A1* | 1/2015 | Roberts .............. | H04B 10/1129 398/118 |
| 2016/0203661 A1* | 7/2016 | Pudar ..................... | B60R 25/24 340/5.25 |

* cited by examiner

*Primary Examiner* — M. R. Sedighian
(74) *Attorney, Agent, or Firm* — Reising Ethington, P.C.

(57) ABSTRACT

A vehicle communication system may include a first vehicle node, a second vehicle node, and a fiber optic node connection. The first vehicle node includes an electronic processing unit coupled to a first communication circuit that includes a plurality of self-configuring optical cells. The fiber optic node connection couples the first vehicle node to the second vehicle node using at least some of the self-configuring optical cells. In response to a trigger event, the electronic processing unit is adapted to configure the plurality of self-configuring optical cells to enable communication between the first and second vehicle nodes via the fiber optic node connection.

18 Claims, 5 Drawing Sheets

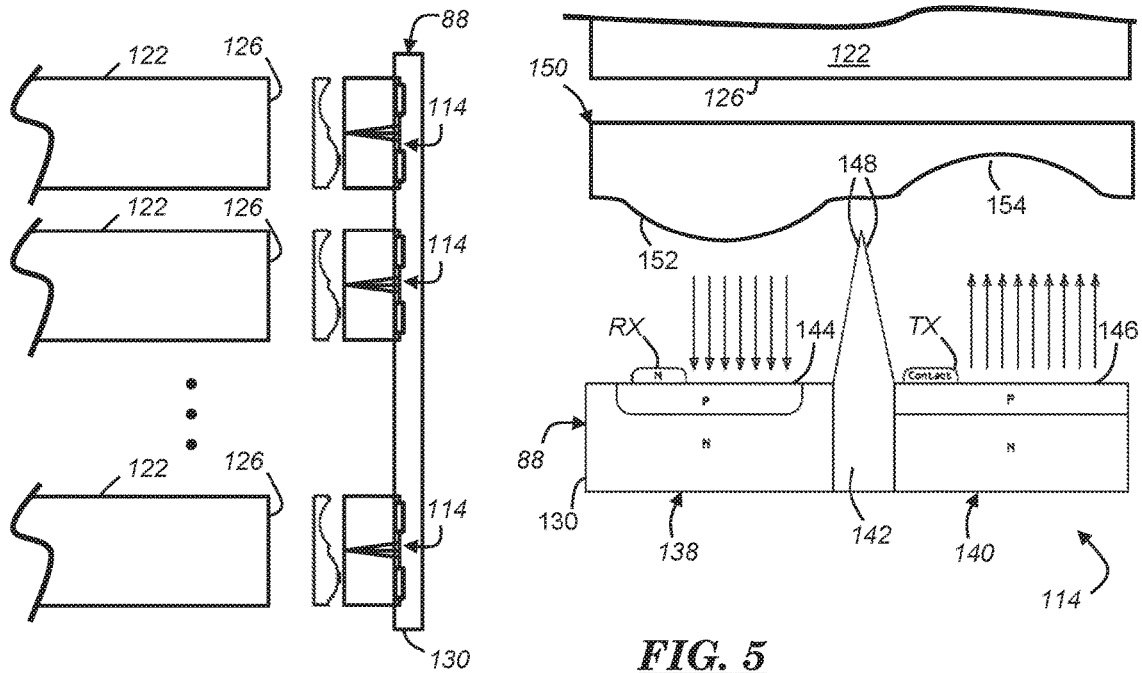
FIG. 4
FIG. 5
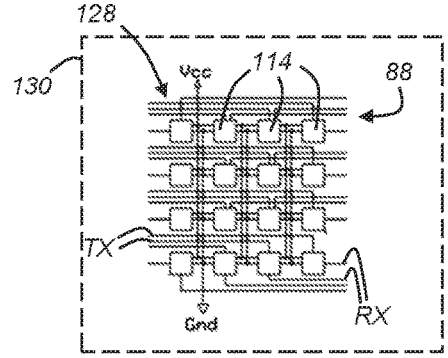
FIG. 6
FIG. 7
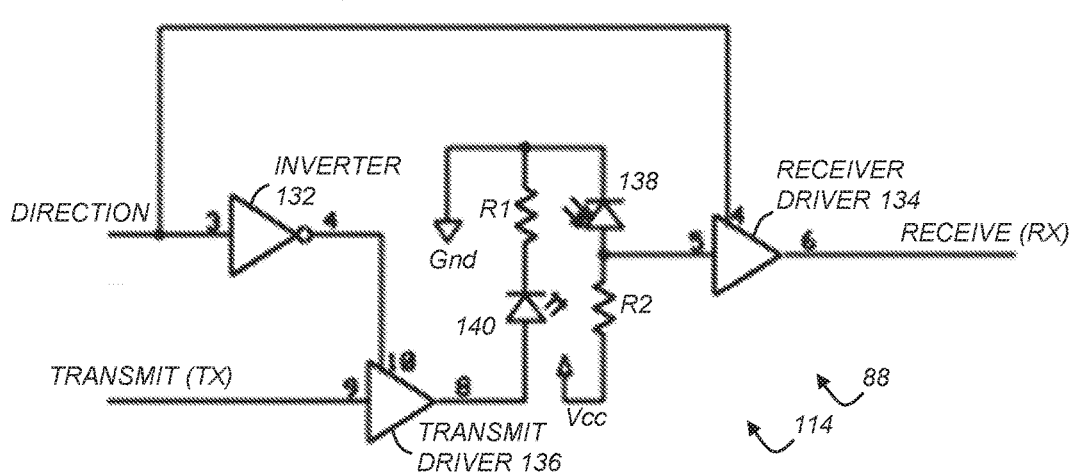

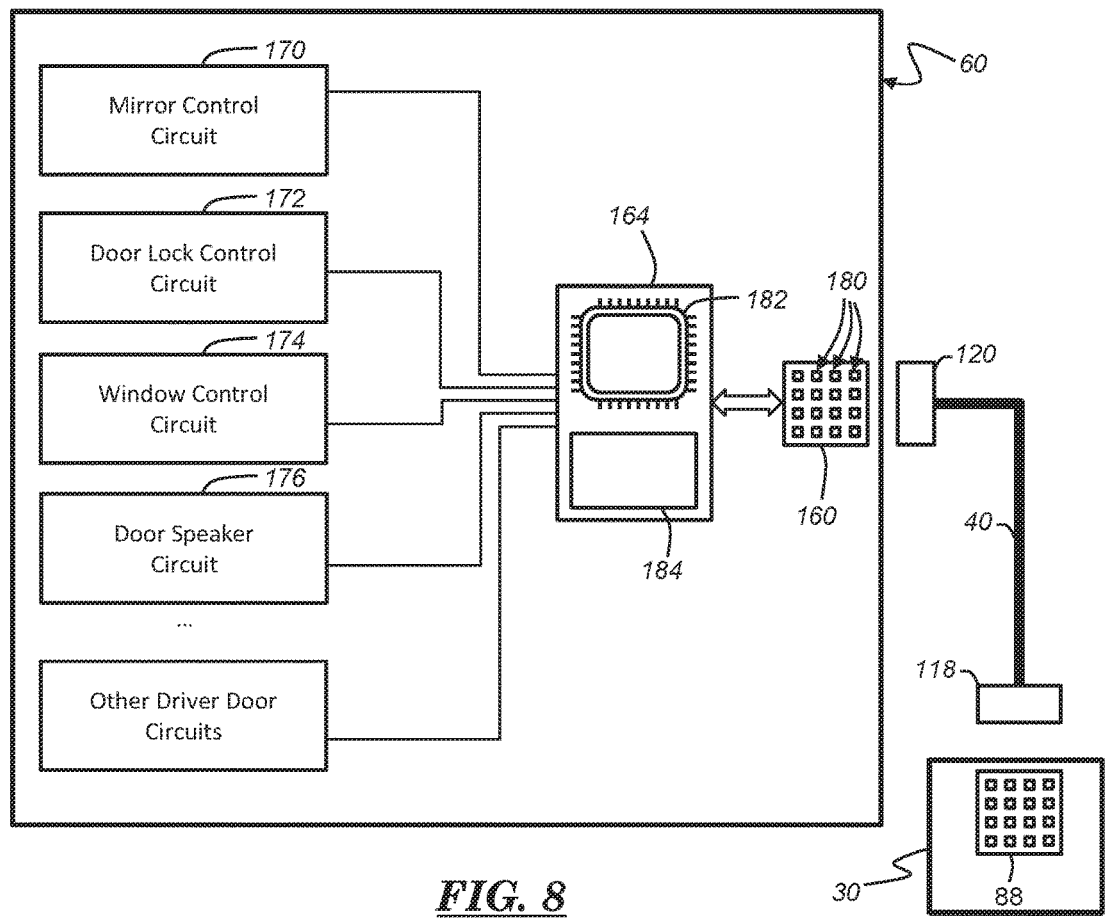
FIG. 8
FIG. 9
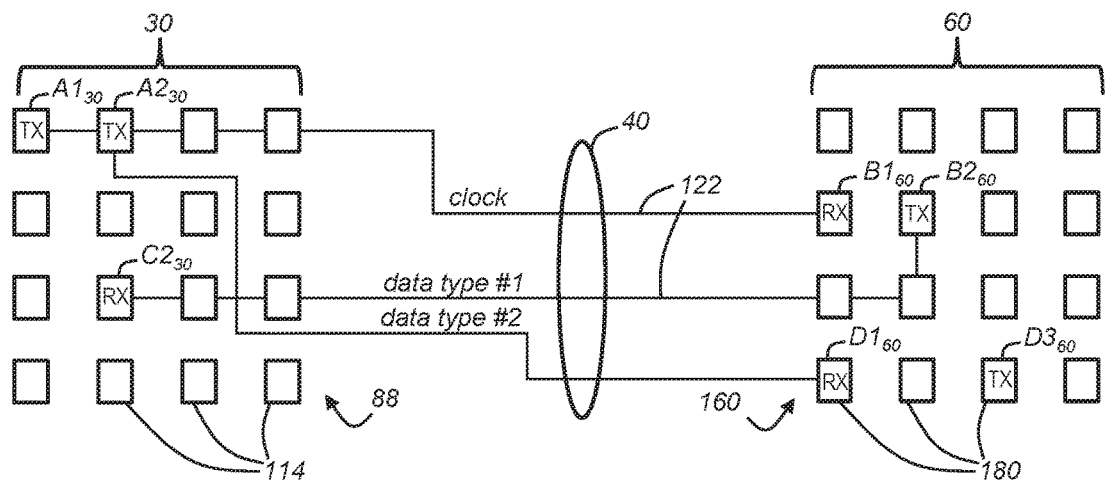

VEHICLE COMMUNICATION SYSTEM HAVING SELF-CONFIGURING OPTICAL INTERFACES

FIELD

The present invention is directed generally to vehicle communication systems and, more particularly, to vehicle communication systems or architectures that include a number of self-configuring optical interfaces.

BACKGROUND

A communication system for a modern vehicle typically includes an internal vehicle bus that interconnects sensors, actuators, control units, etc. according to specialized networking protocols and standards. Some examples of commonly used vehicle networking protocols and standards include Controller Area Network (CAN), Local Interconnect Network (LIN) and others.

SUMMARY

According to one embodiment, there is provided a vehicle communication system that includes: a first vehicle node that includes: an electronic processing unit; and a first communication circuit comprising a plurality of optical cells, wherein the electronic processing unit is coupled to the first communication circuit; a second vehicle node; and a node connection coupling the first vehicle node to the second vehicle node via at least some of the plurality of optical cells, wherein, in response to a trigger event, the electronic processing unit is adapted to configure the plurality of optical cells to enable communication between the first and second vehicle nodes via the node connection.

According to another embodiment, there is provided a vehicle communication system that includes: a central node manager that includes: a first electronic processing unit (EPU); a first optical interface circuit, comprising a first plurality of optical cells; a local node that includes: a second electronic processing unit (EPU); a second optical interface circuit, comprising a second plurality of optical cells; and a node connection comprising a plurality of light guides optically coupled to the first and second pluralities of optical cells, wherein the first and second optical interface circuits are configured by the first and second EPUs once per ignition cycle, wherein, for at least some of the optical cells of the first and second plurality of optical cells, the first and second EPUs are adapted to configure one or more of a transmit (TX) or receive (RX) function, a data type, or an identifying location of the respective optical cell.

According to another embodiment, there is provided a method of configuring a vehicle communication system, including the steps of: prior to transmitting vehicle data over the vehicle communication system, performing the following configuration steps: tagging a first optical cell at a first interface circuit of a central node manager; transmitting a first test signal to a second optical cell at a second interface circuit of a local node, wherein the first test signal is transmitted via the first optical cell; in response to receiving the first test signal at the second optical cell, tagging a third optical cell at the second interface circuit; transmitting a second test signal to a fourth optical cell at the first interface circuit, wherein the second test signal is transmitted via the third optical cell; and then transmitting the vehicle data from the first interface circuit to the second interface circuit by sending the vehicle data using the first and second optical cells or transmitting vehicle data from the second interface circuit to the first interface circuit by sending the vehicle data using the third and fourth optical cells.

DRAWINGS

Preferred exemplary embodiments will hereinafter be described in conjunction with the appended drawings, wherein like designations denote like elements, and wherein:

FIG. 4 is a schematic diagram of a portion of the node connection and the communication circuit shown in FIG. 3, the communication circuit having a number of exemplary optical cells;

FIG. 5 is a schematic diagram of one of the optical cells of FIG. 4;

FIG. 6 is an exemplary electrical diagram of the communication circuit of FIG. 3;

FIG. 7 is an exemplary electrical diagram of one of the optical cells of FIG. 6;

FIG. 8 is a schematic block diagram of an exemplary driver door node that may be used with the vehicle communication system of FIG. 1;

FIG. 9 is a schematic diagram that includes the communication circuit and node connection of FIG. 3 as well as another communication circuit associated with the driver door node of FIG. 8.

DESCRIPTION

The system described below pertains to vehicle communication circuits each having an interface which may be coupled or connected to a vehicle harness or cable. Generally, such interfaces are predefined—e.g., a pinout diagram generally indicates which pin or socket at the interface is power, ground, data1, data2, clock, etc. The present system provides interfaces which may be configured by the communication circuits themselves. As will be explained more below, in a preferred embodiment, this configuring (or so-called 'self-configuring') may occur following a vehicle ignition cycle. And once the self-configuration has occurred (i.e., the interfaces are defined), the vehicle communication circuits may communicate with one another or other vehicle electronics.

Figure 1:
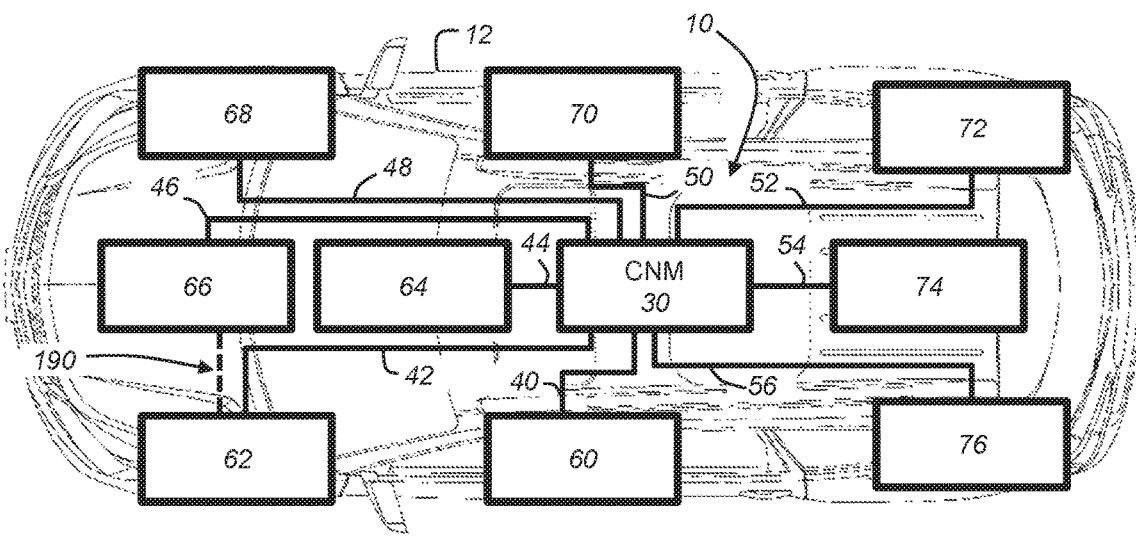
FIG. 1 is a schematic block diagram of an exemplary vehicle communication system having a central node manager and a number of local nodes located throughout the vehicle.

With reference to FIG. 1, there is shown a vehicle communication system 10 installed on a vehicle 12, where the system includes a central node or central node manager (CNM) 30, a number of node connections 40-56, and a number of local nodes 60-76 located throughout the vehicle. The local nodes of system 10 can be designed to manage most or even all of the functions or tasks in a particular zone or area of the vehicle 12 so that interaction with the central node manager 30 can be minimized. System 10 is an optical system based on fiber optic or waveguide (or light guide) communication techniques. It should be appreciated that the following description of the vehicle communication system 10, as well as the various components or pieces thereof, is only intended to illustrate one potential example or embodiment, as the present invention is not limited to that description. System 10 may be utilized in any type of vehicle including, but certainly not limited to, passenger cars, sports utility vehicles (SUVs), trucks, motorcycles, recreational vehicles (RVs), marine vessels, aircraft, etc. Moreover, the self-configuring optical interfaces disclosed herein may be used in other communication systems as well and are not limited to the system 10 shown in FIG. 1.

Figure 2:
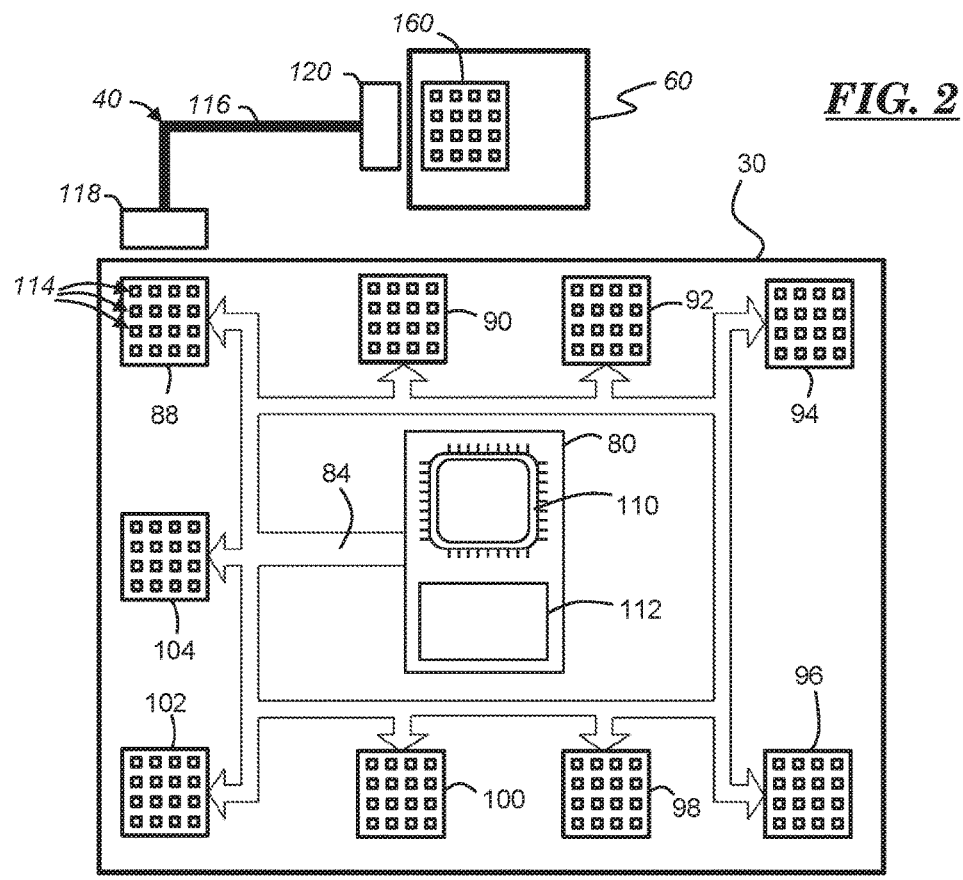
FIG. 2 is a schematic block diagram of an exemplary central node manager that may be used with the vehicle communication system of FIG. 1.

The central node manager 30 acts as a primary or master controller for system 10 and communicates with the various local nodes 60-76 located throughout the vehicle in order to carry out a number of different tasks. In the particular embodiment of FIG. 1, there is only shown a single central node manager 30, but it is possible for system 10 to include multiple node managers instead. For instance, a first node manager could be provided to control location-based nodes associated with vehicle and body electronics, where a second node manager could be provided to oversee location-based nodes associated with the chassis or powertrain. Turning to FIG. 2, there is shown a block diagram of an exemplary central node manager 30, where the node manager generally includes an electronic processing unit 80, a shared data path 84, a number of communication circuits 88-104 (one for each of the local nodes 60-76), as well as other suitable power management circuitry, memory, support circuitry and/or other components known in the art. Other configurations and communication technologies may be employed instead.

Electronic processing unit 80 may carry out a variety of processing functions and tasks on behalf of the central node manager 30 and, according to the embodiment illustrated in FIG. 2, includes a digital processor 110 and memory 112. It is also possible for the electronic processing unit 80 to be one of several processing units that are part of the central node manager 30. To elaborate, FIG. 2 only shows a general and schematic view of one potential implementation of the central node manager, as that device could instead include multiple electronic processing units configured to work together to efficiently divide the tasks and responsibilities at hand. In one non-limiting example, central node manager 30 may be a multi-CPU control center or primary interface module that includes four or more separate CPUs arranged to allow for parallel operation and to improve system control. In the case of multiple electronic processing units, each unit may be assigned to one or more communication circuits, where each communication circuit is in turn configured for communicating with one or more local nodes 60-76. In such an arrangement, it is likely that a single electronic processing unit, such as unit 80, would service multiple communication circuits and hence multiple local nodes, as is shown in FIG. 2.

Shared data path 84 electronically connects the electronic processing unit 80 to one or more communication circuits 88-104, as well as other components, devices, circuits, etc. within the central node manager 30. The exact nature of the shared data path is largely dependent on the overall system architecture, the number of local nodes to which the central node manager 30 is connected, etc. For example, because the communication circuits 88-104 are provided as optical interface circuits designed to communicate with local nodes 60-76 over fiber optic node connections 40-56, respectively, as shown in the embodiment illustrated in FIGS. 1 and 2, then the shared data path 84 may include any type of suitable high-speed parallel or serial connections. As will be described below, the optical interface circuits 88-104 are adapted to transduce an electrical signal carried via shared data path 84 from/to an optical signal carried via node connection 40-56. However, it is possible for the shared data path 84 to be in optical in nature, if that is the selected design choice. Those skilled in the art will appreciate that a system architect or system engineer will likely be best suited to select a suitable shared data path 84.

Communication circuits 88-104 are designed to act as transmitters and/or receivers that facilitate communication between the electronic processing unit 80 and the various local nodes 60-76 located throughout the vehicle. The communication circuits are in the form of optical interface circuits that have been adapted for data communication within system 10 and will hereafter be referred to as optical interface circuits 88-104. In at least one embodiment, optical interface circuit 88 is dedicated and connected to local node 60 and includes multiple optical cells 114 which operate as portals to different communication channels between nodes 30 and 60. For example, in at least one embodiment, the electronic processing unit 80 may transmit data to the local node 60 via optical cell 114 or may receive data at the processing unit 80 from the local node 60 via optical cell 114. In at least one implementation, half of the optical cells 114 could be dedicated to transmitting to the local node 60, and the remaining half of the optical cells 114 could be dedicated to receiving from the local node 60. A "dedicated" circuit, as that term is used here in the context of optical interface circuits 88-104, refers to a communication circuit in the central node manager that is arranged for communication with a single, particular local node. And while the illustrated embodiment describes a circuit operating in both a transmit mode and a receive mode, it should be appreciated that any of the communication circuits may be uni-directional instead—e.g., all optical cells 114 of the respective communication circuit could be configured to transmit, or all optical cells 114 of the respective circuit could be configured to receive. In these alternative instances, the circuit(s) 88-104 would only be able to send data to or receive data from a particular local node, depending on the specific setup.

Figure 3:
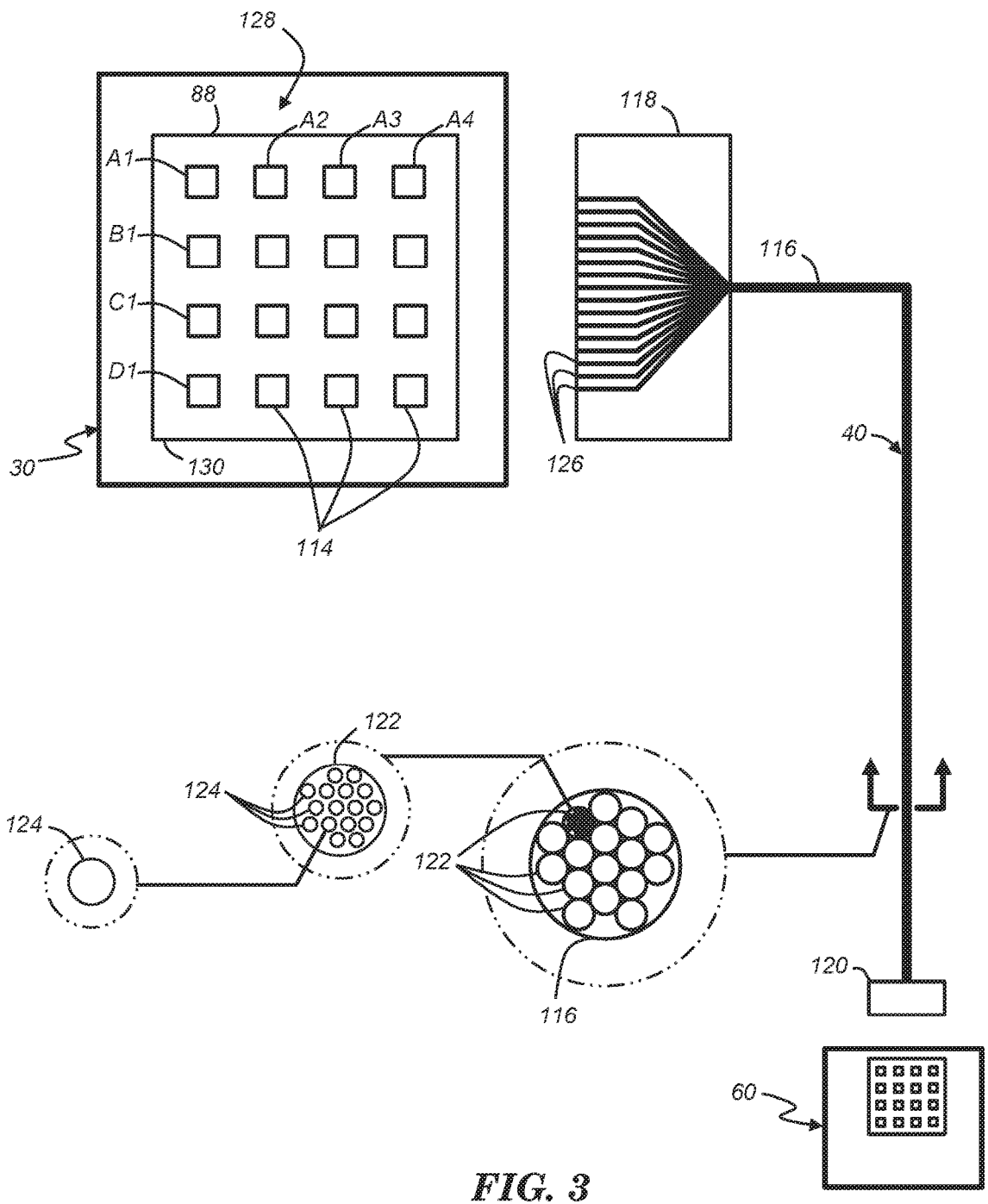
FIG. 3 is a schematic diagram of an exemplary communication circuit associated with the central node manager and a node connection coupling the central node manager to one of the local nodes.

As shown in FIG. 2, node connection 40 may comprise a harness bundle or fiber optic cable 116 and end connectors 118, 120. And FIG. 3 illustrates that the harness bundle 116 may comprise multiple fiber optic pipes or light pipes 122—each pipe 122 comprising multiple fiber optic strands 124. Each strand 124 can be comprised of any suitable material (e.g., glass, one or more polymers, a combination thereof, etc.). While each pipe 122 may have a predetermined quantity of strands 124 (e.g., 1024 strands), this is merely an example, and skilled artisans will appreciate the various ways to construct and assemble fiber optic cables, connectors, etc. In the illustrated embodiment, sixteen pipes 122 are shown per cable 116, each pipe 122 having sixteen strands 124; thus, each pipe 122 may correspond to one of the optical cells 114, as will be explained more below. However, this quantity is merely one example. Other implementations may have more or fewer pipes, more or fewer strands per pipe, etc. At each connector 118, 120, an end region of each pipe 122 may have a termination 126 for projecting light onto the optical cell 114 or receiving light therefrom (see FIGS. 3 and 4).

It should be appreciated that in traditional cable architectures, each pin or socket in the connector is predefined; e.g., the pinout (as that term is understood by skilled artisans) might include: pin 1=data, pin 2=clock signal, etc. As will be explained in the method described below, the optical interface circuit 88 may not be preconfigured; instead, it may be periodically re-configurable or self-configurable. For example, one optical cell 114 of the optical interface circuit 88 could be designated as 'data' during one vehicle ignition cycle, and the same optical cell 114 could be designated as a 'clock signal' during the next ignition cycle; similarly, other optical cells 114 may be designated differently each ignition cycle.

As will be appreciated by skilled artisans, fiber optic cable 116 may reduce the overall size and weight of node connection 40. For example, the use of fiber optic pipes 122 and strands 124 may reduce the cross-sectional area of the cable 116 allowing the cable 116 to be more flexibly routed within vehicle 12. In addition, the weight of fiber optic cables 116 are generally lighter than their traditional metal wire counterparts. This weight reduction, particularly when multiplied across a large number of other node connections in the vehicle, can add up to a significant reduction in vehicle weight and improve fuel economy, emissions, etc. In at least one embodiment, each of the node connections 40-56 have a similar construction to that shown in FIG. 3 and described above. Thus, using a standard or common cable for a number of local nodes in the vehicle can reduce complexity and cost in the vehicle.

Complexity of the node connection 40 is reduced further as the pipes 122 within node connection 40 are not required to follow a specified pinout. For example, during assembly of the cable 116, each pipe termination 126 may be matched or paired with any one of the optical cells 114 of circuit 88. Essentially, each termination 126 may be randomly matched to an optical cell 114. As will become apparent in the discussion below, the same is true of each pipe termination at the opposing end of the cable 116. Skilled artisans will appreciate that time and cost savings may be realized when the pinout arrangement of a cable can be random and does not need to be specific and verified. Thus ultimately, when the node connection 40 is constructed, the pinout at each end is unknown; however, as will be explained more below, the circuit 88 may self-configure its own pinout—e.g., the identity of one or more optical cells 114 at circuit 88 being determined at the time of self-configuration.

Returning to FIG. 3, the enlarged schematic view of the optical interface circuit 88 illustrates an array 128 of optical cells 114 carried by a substrate or base 130. In the illustrated embodiment, a four-by-four array of optical cells 114 is shown (e.g., row: A1, A2, A3, A4; row: B1, B2, etc.); however, this is merely an example. For example, the array 128 could be any suitable size and need not have equal rows and columns. Further, while FIGS. 2 and 3 illustrate each optical interface circuit 88-104 having four-by-four optical cell arrays, this is not required either. For example, the size of the arrays of circuits 88-104 may differ in other implementations. Additionally, some optical interface circuits may not include rows and columns; e.g., instead other arrangements of optical cells 114 are possible (e.g., a cluster arrangement, a spiral arrangement, etc.). In at least one embodiment, the number of pipes within connector 118 corresponds to the number of optical elements 114 at the interface circuit 88 (e.g., a one-to-one relationship); however, this is not required.

When the optical interface circuit 88 is arranged as an array 128, the complexity of the circuit 88 may be reduced further. For example, when a square array is used (e.g., like the four-by-four array illustrated in FIG. 3), the connector 118 and the circuit 88 (at node 30) may not require keying. As used herein, a keyed connector is one which comprises one or more mechanical elements (e.g., tabs, protrusions, channels, etc.) which prevent two interfaces from being incorrectly oriented when they are mated. Thus, for example, in the present disclosure, the connector 118 and the circuit 88 could be keyed so that each termination 126 at the connector 118 may be matched with a specific optical cell 114. However, due to the self-configuring capability of the circuit 88, orientation and keying are unnecessary. For example, the connector 118 could be rotated 90 degrees and mated, rotated 180 degrees and mated, or rotated 270 degrees and mated, and after the circuit 88 self-configures, the central node manager 30 would still be able to communicate with the local node 60. The array 128 also could be other shapes—e.g., a rectangle, and where the terminations 126 also are arranged rectangularly, no keying may be required. Still other array shapes may have identical or similar advantages and also are contemplated herein.

The substrate 130 may be comprised of any suitable material—e.g., a semi-conductive material being doped as an NPN junction, a PNP junction, etc. In at least one implementation, the configuration of the substrate 130 includes an array of NPN junctions. FIG. 5 illustrates one embodiment of the optical cell 114 of the optical interface circuit 88. Here, a receiver 138 is in the form of a photodiode that conducts current when light or photonic radiation (inbound photons represented by series of parallel arrows on the left in FIG. 5) strikes the PN junction within the device. Conversely, a transmitter 140 is in the form of a laser diode that emits light or photonic radiation (outbound photons represented by series of parallel arrows on the right in FIG. 5) when current passes through the PN junction within the device. While the illustrated embodiment specifically comprises photodiodes and laser diodes, it should be appreciated that other embodiments exist that use other components.

FIG. 5 also illustrates a spacer or divider 142 located between a surface 144 of receiver 138 and a surface 146 of transmitter 140. The spacer 142 may have a reflective surface or coating 148 to assist in re-directing scattered light—i.e., light received from pipe 122 (toward receiver 138) and/or light transmitted from the transmitter 140 (toward pipe 122). FIG. 5 also illustrates an optic or lens 150. The optic 150 may be positioned between the surfaces 144, 146 and the termination 126 of the pipe 122; and the optic 150 may be oriented so that a convex region 152 of the optic 150 focuses received light received from pipe 122 onto receiver surface 144 and so that a concave region 154 focuses light from transmitter surface 146 into the pipe 122. Optic 150 may be comprised of acrylic or any other suitable transparent material. Skilled artisans will appreciate various techniques to design and manufacture the substrate 130 described above having multiple optical cells 114. Further, some embodiments may omit the spacer 142, the optic 150, or both or utilize some other combination of components.

FIG. 6 illustrates an electrical schematic of the optical interface circuit 88. Each of the optical cells 114 may be coupled electrically to a common potential voltage (Vcc) and a common ground (Gnd). Further, each cell 114 is coupled to a TX (Transmit) line and a RX (Receive) line. As will be explained in greater detail below, each optical cell 114 may be toggled between a receive mode and a transmit mode. In the receive mode, a message or data may be received from the local node 60 and delivered to the electronic processing unit 80. In the transmit mode, a message or data may be sent from the electronic processing unit 80 to the local node 60. In at least one implementation, the wires, traces, etc. of FIG. 6, as well as the electronic components shown in FIG. 7, are carried by the substrate 130 of this switchable optical cell 114.

In FIG. 7, an electrical circuit 156 of a single, exemplary optical cell 114 is shown. Each cell 114 comprises an inverter 132, a receiver driver 134, a transmit driver 136, the receiver or photo diode 138, the transmitter or laser diode 140, and resistors R1, R2. The optical cell 114 can either transmit or receive data depending on the state of the DIRECTION control line on pin 3; when the DIRECTION control line is high, the receiver driver 134 is active and the optical cell 114 is in a receive mode; when the DIRECTION control line is low, the transmit driver 136 is active and the optical cell 114 is in a transmit mode. The arrangement of elements in circuit 156 is described below with respect to their function.

The circuit 156 may be toggled to the receive mode by the electronic processing unit 80 sending an enable signal to the circuit 156 via the DIRECTION control line. As used herein, a HIGH signal includes any signal associated with an enabling state, an active state or a digital '1' (e.g., a voltage of approximately 5V, 3.3V, 1.8V, or the like). When the DIRECTION control line is HIGH, the receiver driver 134 is activated at pin 4 while the inverter 132 inverts the DIRECTION control line signal to LOW such that the transmit driver 136 is inactivated or deactivated at pin 10. In this scenario, the circuit 156 is functioning as a receiver or is in a receive mode because the data received by the photo diode 138, which is part of a simple voltage divider that also includes resistor R2, is present at the output of the receiver driver 134 or pin 6.

As used herein, a LOW signal includes any signal associated with a disabling state, an inactive state or a digital '0' (e.g., a voltage of approximately 0V, or the like). When the DIRECTION control line is LOW, the receiver driver 134 is inactivated or deactivated at pin 4 while the inverter 132 inverts the DIRECTION control line signal to HIGH such that the transmit driver 136 is activated at pin 10. In this scenario, the circuit 156 is functioning as a transmitter or is in a transmit mode because the data presented to the input of the transmit driver 136 at pin 9 will fire the laser diode 140 causing a stream of photos or light to flow from that device out through the channeling lens 154 and into the light pipe 122. Thus, it will be apparent that in this implementation, the circuit 156 operates in either the receive mode or the transmit mode, but not both simultaneously.

Turning now to FIG. 8, there is shown an exemplary driver door node 60 that includes the optical interface circuit 160, an electronic processing unit 164, a mirror control circuit 170, a door lock control circuit 172, a window control circuit 174, and a door speaker circuit 176. The local node 60 for the driver door could, of course, include a different combination of circuits and components than is shown here, as this particular combination of circuits is only meant to illustrate one potential embodiment of a driver side door. For example, it is envisioned that the driver door node 60 could also include circuits for controlling memory seats, mirrors, steering wheel position, etc., as well as those for other features like a door-mounted antenna, to cite just a few of the possibilities. It is also envisioned that the driver door node 60, as well as any combination of other local nodes in the vehicle, could also be connected with other types of vehicle buses (e.g., UART, CAN, GMLAN, FlexRay, LIN, etc.) in addition to the node connections described above. Generally speaking, system 10 seeks to remove or minimize as many of these other buses as possible in favor of fiber optic connections. It should be appreciated that the driver door node 60 has been selected to illustrate the optical interface circuit 160, but that this circuit could be part of any of the other local nodes 62-76. As will be explained in greater detail below, the connector 120 and circuit 160 are similar to the connector 118 and circuit 88, respectively. To the extent these devices are similar, the description of the connector 120 and the optical interface circuit 160 will not be reproduced here.

The optical interface circuit 160 may include a first interface that is adapted for data communication with the central node manager 30 over node connection 40, and a second interface that is adapted for data communication with the rest of the local node 60. The first interface of the optical interface circuit 160 may be directly coupled to the node connection 40 using optical cells 180—having similar construction and operation as the cells 114, described above. And the second interface may be directly or indirectly coupled to the various control circuits 170-176 (e.g., indirectly coupled via electronic processing unit 164 or directly coupled to the inputs of circuits 170-176). It should be appreciated that circuit 160 is preferably the counterpart to the corresponding circuit 88 located in the central node manager 30, thus, a duplicative description of this component has been omitted. All of the features and characteristics of circuit 88 described above apply equally to optical interface circuit 160. During operation in a central operational state, the circuit 160 may wake up or activate the electronic processing unit 164 in response to a clock or other signal provided by the central node manager 30, the local node 60 itself, or some other source.

Electronic processing unit 164, which is an optional component, may be designed to carry out certain tasks or functions for the particular local node in which it is located and can include a digital processor 182 and memory 184. The exact nature and type of electronic processing unit that is needed depends greatly on the particular local node or area module which it is servicing, as it is possible for a single local node to include one or more processing units incorporating synchronous and/or asynchronous operations.

Method—

Figure 10:
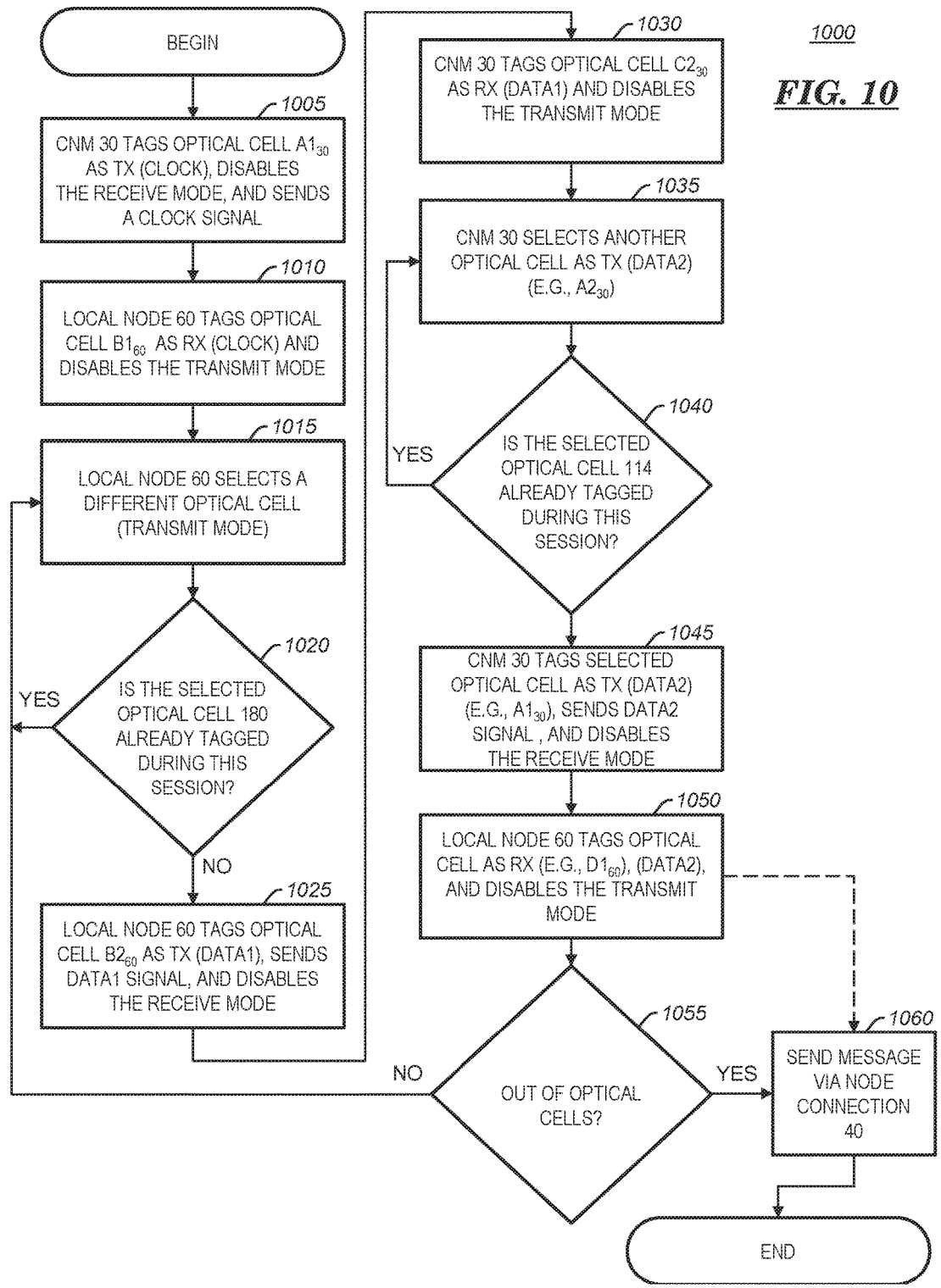
FIG. 10 is a flow chart illustrating an exemplary method of self-configuring the communication circuits shown in FIG. 9.

FIG. 10 illustrates a method 1000 of using system 10 to perform an initiation or self-configuration process associated with the optical interface circuits 88, 160 (of the central node manager 30 and local node 60, respectively). This self-configuration includes determining which optical cells 114, 180 will be used to communicate during a communication session between the two nodes 30, 60. Following the self-configuration, the central node manager 30 may communicate vehicle data with the local node 60 and carry-out any suitable vehicle task—e.g., receiving vehicle data pertaining to the driver's mirror, window, speaker unit, etc. and/or transmitting vehicle data or commands to the door module (e.g., a door unlock command, a command to actuate power windows, etc.).

Method 1000 may begin with step 1005. In step 1005, the electronic processing unit 80 of the central node manager (CNM) 30 selects one optical cell of optical interface circuit 88 and designates or tags this cell as CLOCK. As used herein, designating or tagging an optical cell includes storing an identifying location of the optical cell in memory available to an electronic processing unit along with an associated function, data type, or both. In at least some implementations, the associated function may be a 'transmit function' or a 'receive function' associated with the particular optical cell. As will be explained more below, tagging may occur at the central node manager 30 or at the respective local node 60-76, and the tagging may be temporary—i.e., associated with a communication session between the nodes 30 and 60. For example, following the session, a tagged optical cell may be untagged and ready to be tagged in the same manner again or tagged differently. Other embodiments of the aforementioned process are also possible; for example, a state machine could be fixed or configured such that every time it is started the state machine goes through a similar process before entering a "communication mode" or the like.

Thus, in step 1005, the electronic processing unit 80 may store a transmit (TX) function, a CLOCK data type, and an associated identifying location in memory 112. In at least one embodiment, the identifying location may be an array location (e.g., having a row and column identifier). FIG. 9 is associated with method 1000 and illustrates a schematic diagram of the optical interface circuit 88 (and optical cells 114) coupled to the optical interface circuit 160 (and optical cells 180). Thus in FIG. 9—and for illustrative purposes only—step 1005 may include the processing unit 80 tagging the identifying location $A1_{30}$ as CLOCK.

Step 1005 further may comprise enabling a receive mode or a transmit mode for the respective optical cell. Since the optical cell 114 (e.g., $A1_{30}$) is tagged with a TX function, the electronic processing unit 80 places the cell in the transmit mode—e.g., by sending a LOW enable signal on the DIRECTION control line of the optical cell $A1_{30}$ (see also FIGS. 5-7). This has the simultaneous effect of inactivating the receiver driver for optical cell $A1_{30}$, as already explained. The process of tagging may be somewhat similar to a Data Direction Register (DDR), where cells correlate to locations within the register.

At this point, step 1005 further comprises the electronic processing unit 80 sending or transmitting a clock signal via optical cell $A1_{30}$. The clock signal may be received by one of the optical cells 180 at the optical interface circuit 160 (at local node 60).

In at least one embodiment, step 1005 may occur in response to a trigger or triggering event, such as a vehicle ignition event. For example, the central node manager 30 may be triggered to select one of the optical cells 114 by an ignition module or device in the vehicle 12. In this implementation, the communication session may continue for the duration of the ignition cycle. In other implementations, the selection is otherwise triggered or, e.g., occurring periodically or randomly. In another implementation, the selection is triggered in response to a detected security breach of the system 10. In another implementation, the selection is triggered in response to a communication failure between the node manager 30 and local node 60 (e.g., due to a damaged pipe(s) 122, as will be explained in greater detail below. These are merely examples; and other implementations are contemplated. Following step 1005, the method proceeds to step 1010.

In step 1010, the optical interface circuit 160 receives the clock signal at one of its optical cells 180. Referring again to FIG. 9, the clock signal is received at optical cell $B1_{60}$. The particular cell location again is intended merely to illustrate an example of the operation of the system 10 and is not intended to be limiting. In step 1010, the electronic processing unit 164 tags the optical cell 180 as receive (RX) function, CLOCK data type, and stores the identifying location (cell $B1_{60}$) in memory 180. In tagging the cell $B1_{60}$ as RX function, the electronic processing unit 164 places the cell in the receive mode and simultaneously disables the transmit mode of cell $B1_{60}$—again, at least temporarily—by sending a HIGH enable signal on the DIRECTION control line of cell $B1_{60}$. Then, the method 1000 proceeds to step 1015.

It should be appreciated that in at least one implementation, the optical cell 180 (of circuit 160) which receives the clock signal in step 1010 and its array location may not be previously identified in the circuit 160 (e.g., as the particular optical cell of circuit 160 which receives the central node manager's clock signal). Further, none of the other optical cells 180 may be tagged at the outset of the session; and thus, none of these other optical cells currently may be associated with transmitting, receiving, a specific data type, etc. Furthermore in at least one implementation, the connector 120 may not be keyed; therefore, the pipe terminations may not be matched with the same optical cells 180 as they may had been in a previous connection. Of course, this applies equally to the pipe terminations 126 and optical cells 114 at connector 118. Thus, prior to the self-configuration of the optical interface circuits during the session, it should be apparent that neither circuit was necessarily configured to communicate with the other. However, when optical cells 114, 180 are tagged during the self-configuration process, the interface becomes defined (e.g., essentially generating a session pinout of the circuits 88, 160 and node connection 40). And thereafter, the two circuits 88, 160 are enabled to communicate.

In step 1015, the electronic processing unit 164 selects an optical cell 180 of optical interface circuit 160 to operate in a transmit mode (e.g., for transmitting data to the central node manager 30). In one implementation, the processing unit 164 may select the next sequential optical cell according to the array sequence (e.g., processing unit 164 is shown selecting optical cell $B2_{60}$ in FIG. 9). However, proceeding in this manner is merely an example and is not required. For example, processing unit 164 could select a random optical cell 180 (e.g., $D3_{60}$) or could make a selection based upon any suitable selection pattern. Once the next optical cell 180 is selected by the processing unit 164, the method proceeds to step 1020.

In step 1020, the electronic processing unit 164 checks or determines whether the selected optical cell 180 is already tagged (e.g., checking whether optical cell $B2_{60}$ is tagged already). Processing unit 164 may determine whether memory 180 has already stored the selected identifying location during the current session. For example, if optical cell $B2_{60}$ was not tagged (during the session), the method 1000 proceeds to step 1025. However, if optical cell $B2_{60}$ has been tagged (during the session), the method 1000 may loop back to step 1015 so that the processing unit 164 may select a different optical cell 180. This loop (between steps 1020 and 1015) may occur repeatedly until an untagged optical cell 180 is determined.

In step 1025, the respective optical cell (e.g., $B2_{60}$) is tagged. Thus, for example, the optical cell 180 may be tagged in memory 184 as transmit (TX) function, data type #1, and as identifying location $B2_{60}$. Data type #1 represents one or more suitable types of data to be communicated via optical cell $B2_{60}$; system architects will appreciate the variety of ways to categorize types of data and what data is desirable to be sent via $B2_{60}$. In tagging the cell $B2_{60}$ as TX function, the electronic processing unit 164 places the optical cell 180 in the transmit mode and may concurrently disable the receive mode of cell $B2_{60}$, again at least temporarily. The method then proceeds to step 1030.

In step 1030, the optical interface circuit 160 sends a configuration or test signal (which may or may not identify data type #1) to the circuit 88 via the tagged transmit cell (e.g., $B2_{60}$). The circuit 88 receives this test signal at one of its optical cells 114 (e.g., cell $C2_{30}$)—see FIG. 9 again for an illustrative example. Again, it should be appreciated that cell $C2_{30}$ may be previously unidentified (similar to cell $B1_{60}$ described above). Step 1030 further comprises the electronic processing unit 80 tagging the optical cell 114 as receive (RX) function, data type #1, and storing the identifying location (cell $C2_{30}$) in memory 112. Again, this step may include disabling temporarily the transmit mode of cell $C2_{30}$. Then, the method 1000 proceeds to step 1035.

In step 1035, the central node manager 30 may select another cell 114 for data transmission to the local node 60 (e.g., $A2_{30}$). Step 1035 may be similar to step 1015, except that the central node manager 30 selects the next optical cell 114 (e.g., instead of the local node 60 making the next selection). Again, this selection may occur in any suitable manner—e.g., sequentially, randomly, etc. Thereafter, the method proceeds to step 1040.

In step 1040, the central node manager 30 determines whether the selected cell (e.g., $A2_{30}$) was previously tagged during the current session. Step 1040 may be similar to step 1020, except that the central node manager 30 determines whether the selected optical cell 114 was tagged (e.g., instead of the local node 60 determining whether the selected optical cell 180 has already been tagged). If the cell 114 already has been tagged, the method loops back to step 1035 to select a different optical cell 114. This loop (steps 1040 to step 1035) may be repeated until a second transmit optical cell 114 is determined. When the electronic processing unit 80 determines that the selected optical cell 114 is untagged, then the method proceeds to step 1045.

In step 1045, the respective optical cell (e.g., $A2_{30}$) is tagged. Thus, for example, the optical cell 114 may be tagged in memory 112 as transmit (TX) function, data type #2, and as identifying location $A2_{30}$. Data type #2 represents one or more suitable types of data to be communicated via optical cell $A2_{30}$; again, system architects will appreciate the variety of ways to categorize types of data and what data is desirable to be sent via $A2_{30}$. In tagging the cell $A2_{30}$ as TX function, the electronic processing unit 80 places the optical cell 114 in the transmit mode and may positively disable the receive mode of cell $A2_{30}$, at least temporarily. The method then proceeds to step 1050.

In step 1050, the optical interface circuit 88 sends a configuration or test signal (which may or may not identify data type #2) to the circuit 160 via the tagged transmit cell (e.g., $A2_{30}$). The circuit 160 receives this test signal at one of its optical cells 180 (e.g., cell $D1_{60}$)—see FIG. 9 again for an illustrative example. Again, it should be appreciated that cell $D1_{60}$ may be previously unidentified (similar to cell $B1_{60}$ described above). Step 1045 further comprises the electronic processing unit 164 tagging the optical cell 180 as receive (RX) function, data type #2, and storing the identifying location (cell $D1_{60}$) in memory 184. Again, this step may include disabling temporarily the transmit mode of cell $D1_{60}$. Then, the method 1000 proceeds to step 1055.

It should be appreciated that up to this point, the self-configuration process described above has established: a clock signal channel between the central node manager 30 and the local node ($A1_{30}$ to $B1_{60}$), a dedicated transmit channel from the manager 30 to the local node ($A2_{30}$ to $D1_{60}$), and a dedicated receive channel at the manager 30 from the local node ($B2_{60}$ to $C2_{30}$). Thus in at least one implementation, the bi-lateral communication has been established between the two nodes 30, 60 and the self-configuration may proceed to step 1060. In other implementations, only a portion of the self-configuring steps 1005-1050 may be performed (e.g., to establish uni-lateral communication). Also, in at least one implementation, the clock signal could be transmitted from the local node 60 to the manager 30. In at least one implementation, the remaining optical cells 114, 180 of the circuits 88, 160 are untagged—and the method 1000 proceeds to step 1055.

In step 1055, the processing unit 164 determines whether all of the cells 180 are tagged. In the illustrated embodiment (FIG. 9), the processing unit 164 would determine that only thirteen of the sixteen optical cells 180 are tagged. In this instance, the method would loop back and repeat steps 1015-1055, and in reaching step 1055 again, the processing unit 164 would redetermine whether all cells 180 were tagged and may loop back again to step 1015. In the illustrated embodiment, it should be appreciated that where the quantity of cells 180 equals the quantity of cells 114, the processing unit 164 could be determining inherently whether all cells 114 are tagged when determining whether all optical cells 180 are tagged in step 1055. However, in at least one embodiment, the processing unit 80 could determine whether all optical cells 114 were tagged at step 1055 instead. Eventually, in step 1055, the processing unit(s) determine that all cells 180 (and 114) are tagged and proceeds to step 1060.

In step 1060, a message may be transmitted over the node connection 40 between the central node manager 30 and the local node 60 using the self-configured optical cells 114, 180. This message may be vehicle data such as diagnostic data or a command to perform a task, etc. As used herein, vehicle data comprises any data associated with vehicle 12 except for the data communicated during the self-configuration of the optical cells. Thus, for example, the manager 30 may send a command to the local node 60 to lower a powered vehicle window. Or for example, the local node 60 may send vehicle data to the central node manager 30 regarding a status of the vehicle door locks. These are merely examples of vehicle data and are intended to illustrate how the self-configured interfaces 88, 160 may be used to send and receive communications and are not intended to be limiting. Following step 1060, the method ends.

Skilled artisans will appreciate numerous other messages or communications which may be provided between the nodes 30, 60. Further, on a larger scale, it is contemplated that one or more communication interfaces 90-104 may be self-configured with a corresponding optical interface circuit at one or more of the nodes 62-76, similar to the implementation described above.

Other embodiments also exist. The method above describes the central node manager 30 acting as a master node which initiates the self-configuration sequence, while the local node 30 behaves as a slave node; however, this is not required. For example, instead of the node manager 30 initiating the self-configuration process, one or more local nodes 60-76 could act as the initiator or master node. In addition, while the discussion above pertains to the central node manager 30 establishing a self-configuring interface between it and end node 60, the end nodes could perform similar operations between themselves. For example, in FIG. 1, a node connection 190 is shown coupling end node 62 and end node 66. In such implementations, one node may serve as a master node and the other node as a slave node, and if desired, the master node may send a clock signal to the slave node—e.g., acting as the initiator of the method described above.

Skilled artisans will appreciate that fiber optic strands, pipes, cables, are subject to damage. When one of these light guides is damaged, the communication link between computing devices ceases or is terminated. It should be appreciated that the system 10 is adaptive to such fiber optic damage. For example, since each pipe 122 may comprise multiple strands 124, a number of strands 124 may break, become crimped, or otherwise damaged and the communication link between the central node manager 30 and local node 60 will be unaffected—e.g., the communication link may be maintained by the remaining undamaged strands 124. Further, should a pipe 122 become inoperative due to damage, a new interface between nodes 30 and 60 may be self-configured which excludes the damaged pipe.

For example, in one alternative embodiment, the processing unit (e.g., either 80 and/or 164) detects a communication link failure. This may occur in a variety of ways. For example, by way of illustration only, processing unit 80 may send a data signal via cell $A2_{30}$ and if a response is not received (or not received in a timely fashion) via cell $C2_{30}$, then the processing unit 80 may determine a failure. Other means of determining a potentially damaged communication also exist; e.g., the processing unit(s) 80, 164 may determine the broken link during the self-configuration process. Regardless, once the failure is determined, the system 10 may re-self-configure. This of course may occur when it is safe to do so—e.g., in some instances, this may require the vehicle transmission being in PARK or the like. In instances where the broken link is not safety-related, this may occur at the next ignition cycle; however, if safety or other urgent criteria are present, this may occur at the soonest possible time (e.g., immediately or at least prior to the next ignition cycle). Furthermore, when the self-configuration process is repeated, then the optical cell associated with the communication link failure may be omitted from or skipped over during method 1000.

It should be appreciated that the method(s) described herein may be performed as instructions stored on memory 112 of the electronic processing unit 80 and executed by its processor 110. For example, exemplary instructions include: tagging an optical cell (e.g., $A1_{30}$) of circuit 88 in response to receiving a trigger signal (e.g., associated with a vehicle ignition event); transmitting a clock signal to the local node 60 via that optical cell; receiving a first test signal from the local node 60 at an optical cell (e.g., $C2_{30}$) of circuit 88 in response to transmitting the clock signal; tagging that optical cell (e.g., $C2_{30}$) and tagging another optical cell (e.g., $A2_{30}$); and transmitting a second test signal to the local node 60 via the optical cell (e.g., $A2_{30}$). The instructions further may include sending vehicle data to the local node 60 via the optical cell (e.g., $A2_{30}$), receiving vehicle data from the local node 60 via the optical cell (e.g., $C2_{30}$), or both. And one or more of these instructions may be performed automatically by the system 10—i.e., without user interaction.

Similarly, it should be appreciated that the method(s) described herein may be performed as instructions stored on memory 184 of the electronic processing unit 164 and executed by its processor 182. For example, exemplary instructions include: tagging an optical cell (e.g., $B1_{60}$) in response to receiving a clock signal at the optical cell; tagging another optical cell (e.g., $B2_{60}$) and transmitting a first test signal to the central node manager 30 using the cell (e.g., $B2_{60}$); and receiving from the central node manager 30 a second test signal at another optical cell (e.g., $D1_{60}$) in response to transmitting the first test signal. The instructions further may include sending vehicle data to the central node manager 30 via one of the optical cells (e.g., $B2_{60}$), receiving vehicle data from the central node manager 30 via the optical cell (e.g., $D1_{60}$), or both. And one or more of these instructions may be performed automatically by the system 10—i.e., without user interaction.

Other instructions may be stored in one or more memory devices as well. And the processing unit 80 and/or processing unit 146 may, for example, determine a broken communication link between the nodes 30 and 60 and automatically take corrective or remedial action, as described above.

Thus, there has been described a vehicle communication system comprising multiple vehicle nodes coupled to one another using fiber optic cable or the like. And the vehicle nodes have interfaces which may be repeatedly, automatically self-configured to enable communication of vehicle data between the nodes.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle communication system, comprising:
   a first vehicle node comprising:
      an electronic processing unit; and
      a first communication circuit comprising a base and a plurality of self-configuring optical cells carried by the base, each of the plurality of self-configuring optical cells comprises a photo diode coupled to a receiver driver, a transmit driver coupled to a laser diode, and an inverter coupled to one of the receiver driver or the transmit driver, wherein the electronic processing unit is coupled to the first communication circuit;
   a second vehicle node; and
   a fiber optic node connection coupling the first vehicle node to the second vehicle node via at least some of the plurality of self-configuring optical cells;
   wherein, in response to a trigger event, the electronic processing unit is adapted to configure the plurality of self-configuring optical cells to enable communication between the first and second vehicle nodes via the fiber optic node connection.

2. The system of claim 1, wherein each of the plurality of self-configuring optical cells is optically coupled to an optic adapted to direct light to the fiber optic node connection, from the fiber optic node connection, or both.

3. The system of claim 1, wherein the fiber optic node connection comprises a plurality of light pipes, each light pipe comprising a plurality of fiber optic strands.

4. The system of claim 1, wherein the electronic processing unit comprises a memory and a processor, wherein the memory stores instructions executable by the processor for configuring the plurality of self-configuring optical cells to enable communication between the first and second vehicle nodes via the fiber optic node connection, wherein the instructions comprise:
- in response to receiving a trigger signal at the first vehicle node, tagging a first self-configuring optical cell at the first communication circuit;
- transmitting a clock signal to the second vehicle node via the first self-configuring optical cell;
- in response to transmitting the clock signal, receiving a first test signal from the second vehicle node at a second self-configuring optical cell;
- in response to receiving the first test signal, tagging the second self-configuring optical cell and a third self-configuring optical cell and transmitting a second test signal to the second vehicle node via the third self-configuring optical cell; and then
- sending vehicle data to the second vehicle node via the third self-configuring optical cell, receiving vehicle data from the second vehicle node via the second self-configuring optical cell, or both,
- wherein the plurality of self-configuring optical cells includes the first, second, and third self-configuring optical cells.

5. The system of claim 4, wherein the second vehicle node comprises a second electronic processing unit coupled to a second communication circuit, the second communication circuit comprising a second plurality of self-configuring optical cells, wherein the second electronic processing unit comprises a memory and a processor, wherein the memory of the second electronic processing unit stores instructions executable by the processor for configuring the second plurality of self-configuring optical cells to enable communication between the first and second vehicle nodes via the node connection, wherein the instructions stored on the memory of the second electronic processing unit comprise:
- in response to receiving the clock signal at a fourth self-configuring optical cell of the second communication circuit, tagging the fourth self-configuring optical cell and a fifth self-configuring optical cell of the second communication circuit and transmitting the first test signal to the first vehicle node via the fifth self-configuring optical cell;
- in response to transmitting the first test signal, receiving from the first vehicle node the second test signal at a sixth self-configuring optical cell of the second communication circuit; and then
- sending the vehicle data to the first vehicle node via the fifth self-configuring optical cell, receiving the vehicle data from the first vehicle node via the sixth self-configuring optical cell, or both,
- wherein the second plurality of self-configuring optical cells includes the fourth, fifth, and sixth self-configuring optical cells.

6. The system of claim 1, wherein some of the plurality of self-configuring optical cells are configured to a receive mode and some of the plurality of self-configuring optical cells are configured to a transmit mode, wherein at least one of the plurality of self-configuring optical cells configured in the transmit mode is further configured to transmit a clock signal.

7. The system of claim 1, wherein the electronic processing unit is configured to determine a communication link failure between the first and second vehicle nodes.

8. The system of claim 1, wherein the trigger event occurs at least once per a vehicle ignition cycle.

9. A vehicle communication system, comprising:
- a first vehicle node comprising:
  - an electronic processing unit; and
  - a first communication circuit comprising a plurality of self-configuring optical cells, wherein the electronic processing unit is coupled to the first communication circuit;
- a second vehicle node; and
- a fiber optic node connection being located within a same vehicle as the first and second vehicle nodes and coupling the first vehicle node to the second vehicle node via at least some of the plurality of self-configuring optical cells;
- wherein, in response to a trigger event, the electronic processing unit is adapted to configure the plurality of self-configuring optical cells to enable communication between the first and second vehicle nodes via the fiber optic node connection, and some of the plurality of self-configuring optical cells are configured to a receive mode and some of the plurality of self-configuring optical cells are configured to a transmit mode, and
- wherein the electronic processing unit is adapted to determine a communication link failure between the first and second vehicle nodes, to re-configure the plurality of self-configuring optical cells for communication between the first and second vehicle nodes, and to omit a self-configuring optical cell associated with the communication link failure during the re-configuration.

10. A vehicle communication system, comprising:
- a central node manager, comprising:
  - a first electronic processing unit (EPU);
  - a first optical interface circuit, comprising a first plurality of optical cells;
- a local node, comprising:
  - a second electronic processing unit (EPU);
  - a second optical interface circuit, comprising a second plurality of optical cells;
- each of the first and second optical interface circuits comprises:
  - a base;
  - the first or second plurality of optical cells carried by the base;
  - wherein each of the optical cells in the first or second plurality of optical cells comprises a photo diode coupled to a receiver driver, a transmit driver coupled to a laser diode, and an inverter coupled to one of the receiver driver or the transmit driver;
- a node connection comprising a plurality of light guides is optically coupled to the first and second pluralities of optical cells,
- wherein the first and second optical interface circuits are configured by the first and second EPUs once per ignition cycle, and
- wherein, for at least some of the optical cells of the first and second pluralities of optical cells, the first and second EPUs are adapted to configure one or more of a transmit (TX) or receive (RX) function, a data type, or an identifying location of the respective optical cell.

11. The system of claim 10, wherein each of the optical cells in the first or second plurality of optical cells is optically coupled to an optic adapted to direct light to the node connection, from the node connection, or both.

12. The system of claim 10, wherein the first EPU comprises a first memory and a first processor, wherein the first memory stores instructions executable by the first processor for configuring the first plurality of optical cells to enable communication between the central node manager and the local node via the node connection, wherein the instructions comprise:
- tagging a first optical cell and sending a CLOCK signal to the local node via the first optical cell;
- in response to sending the CLOCK signal, receiving a first test signal at a second optical cell;
- in response to receiving the first test signal at the second optical cell, tagging the second optical cell and tagging a third optical cell; and
- and in response to tagging the third optical cell, sending a second test signal to the local node via the third optical cell,
- wherein the first plurality of optical cells includes the first, second, and third optical cells.

13. The method of claim 12, wherein, in the first memory, the first optical cell is associated with CLOCK in TX mode, the second optical cell is associated with a first data type in RX mode, and the third optical cell is associated with a second data type in TX mode.

14. The system of claim 10, wherein the second EPU comprises a second memory and a second processor, wherein the second memory stores instructions executable by the second processor for configuring the second plurality of optical cells to enable communication between the central node manager and the local node via the node connection, wherein the instructions comprise:
- in response to receiving a CLOCK signal at a first optical cell, tagging the first optical cell and tagging a second optical cell;
- in response to tagging the second optical cell, sending a first test signal to the central node manager via the second optical cell;
- in response to sending the first test signal, receiving a second test signal via a third optical cell; and
- in response to receiving the second test signal, tagging the third optical cell, wherein the second plurality of optical cells includes the first, second, and third optical cells.

15. The method of claim 14, wherein, in the second memory, the first optical cell is associated with CLOCK in RX mode, the second optical cell is associated with a first data type in TX mode, and the third optical cell is associated with a second data type in RX mode.

16. A method of configuring a vehicle communication system, comprising the steps of:
- prior to transmitting vehicle data over the vehicle communication system, performing the following configuration steps:
  - tagging a first optical cell at a first interface circuit of a central node manager;
  - transmitting a first test signal to a second optical cell at a second interface circuit of a local node, wherein the first test signal is transmitted via the first optical cell;
  - in response to receiving the first test signal at the second optical cell, tagging a third optical cell at the second interface circuit;
  - transmitting a second test signal to a fourth optical cell at the first interface circuit, wherein the second test signal is transmitted via the third optical cell; and then
- transmitting the vehicle data from the first interface circuit to the second interface circuit by sending the vehicle data using the first and second optical cells or transmitting vehicle data from the second interface circuit to the first interface circuit by sending the vehicle data using the third and fourth optical cells.

17. The method of claim 16, wherein the configuration steps are repeated each vehicle ignition cycle.

18. The method of claim 16, wherein the tagged first and third optical cells are randomly selected by a different electronic processing unit in each of the central node manager and the local node.

* * * * *